(12) United States Patent
Arata et al.

(10) Patent No.: US 7,623,702 B2
(45) Date of Patent: Nov. 24, 2009

(54) CONTOUR TRIANGULATION SYSTEM AND METHOD

(75) Inventors: Louis K. Arata, Mentor, OH (US); Min Wu, Davie, FL (US)

(73) Assignee: Mako Surgical Corp., Ft. Lauderdale, FL (US)

( * ) Notice: Subject to any disclaimer, the term of this patent is extended or adjusted under 35 U.S.C. 154(b) by 686 days.

(21) Appl. No.: 11/411,951

(22) Filed: Apr. 27, 2006

(65) Prior Publication Data

US 2007/0253617 A1    Nov. 1, 2007

(51) Int. Cl.
*G06K 9/00* (2006.01)
(52) U.S. Cl. .................. 382/154; 250/559.23; 356/602; 382/131; 382/203; 600/424
(58) Field of Classification Search ................. 345/419; 382/154, 128, 131, 203; 250/559.23; 356/602; 600/424
See application file for complete search history.

(56) References Cited

U.S. PATENT DOCUMENTS

| 6,205,243 | B1* | 3/2001 | Migdal et al. ................ 382/154 |
| 7,271,377 | B2* | 9/2007 | Mueller et al. ............ 250/208.1 |
| 7,324,132 | B2* | 1/2008 | Said et al. .................... 348/146 |
| 2001/0021806 | A1* | 9/2001 | Gueziec et al. .............. 600/425 |
| 2002/0028418 | A1* | 3/2002 | Farag et al. .................... 433/29 |
| 2004/0017369 | A1* | 1/2004 | Hultgren et al. ............. 345/423 |
| 2005/0180623 | A1* | 8/2005 | Mueller et al. .............. 382/154 |
| 2006/0017720 | A1* | 1/2006 | Li ............................... 345/419 |
| 2006/0228009 | A1* | 10/2006 | Fidrich et al. ................ 382/128 |
| 2007/0253617 | A1* | 11/2007 | Arata et al. .................. 382/154 |
| 2008/0137940 | A1* | 6/2008 | Kakinami et al. ........... 382/154 |

OTHER PUBLICATIONS

Christiansen, H.N., et al, "Conversion of Complex Contour Line Definitions into Polygonal Element Mosaics", Proceeding of the 5$^{th}$ Annual International Conference on Computer Graphics and Interactive Techniques, Dec. 31, 1978, pp. 187-192.

(Continued)

*Primary Examiner*—Gregory M Desire
(74) *Attorney, Agent, or Firm*—Foley & Lardner LLP

(57) ABSTRACT

A method and apparatus for reconstructing a surface shape of an object having contour lines, includes assigning points to each contour line. A first triangulation scheme is performed with respect to respective points on two adjacently-positioned contour lines, to determine a first surface shape for a portion of the object corresponding to the two contour lines. The first surface shape is checked to determine if the first surface shape is in error. If the first surface shape is not in error, the first surface shape is outputted for the portion of the object as determined by the first triangulation scheme, as a reconstructed surface shape for that portion of the object. If the first surface shape is in error, a second triangulation scheme is performed with respect to the respective points on the two contour lines, to determine a second surface shape for that portion of the object, and the second surface shape is outputted for that portion of the object as determined by the second triangulation scheme, as a reconstructed surface shape.

51 Claims, 9 Drawing Sheets

OTHER PUBLICATIONS

Fuchs, H et al, "Optimal Surface Reconstruction from Planar Contours", Association for Computing Machinery, Inc. vol. 20, No. 10, Oct. 1977, pp. 693-702.

Ekoule et al., "A Triangulation Algorithm from Arbitrary Shaped Multiple Planar Contours," *AMC Transactions on Graphics*, vol. 10, No. 2, pp. 182-199, 1991.

Keppel, "Approximating Complex Surfaces by Triangulation of Contour Lines," *Ibm. J. Res. Develop.*, vol. 19, 2-11, 1975.

P. Nong Cook et al., "Three-Dimensional Reconstruction from Serial Sections for Medical Applications," *Proceedings of the Fourteenth Hawaii International Conference on Systems Sciences-Medical Information Processing*, (1981), pp. 358-389, vol. II, Section I, Western Periodicals Company.

\* cited by examiner

CONTOUR TRIANGULATION SYSTEM AND METHOD

BACKGROUND OF THE INVENTION

1. Field of the Invention

The invention relates to a system and method for constructing a surface shape from a plurality of contour lines provided on parallel or substantially parallel planes.

2. Description of Related Art

In the area of biomedicine, acquiring an accurate three dimensional (3D) surface of the human anatomy (e.g., bones, tumors, tissues) is very helpful in image-guided therapy, such as image-guided surgery, and radiation therapy planning. Computed Tomography (CT), Magnetic Resonance Imaging (MRI), Positron Emission Tomography (PET), Single Photon Emission Computed Tomography (SPECT), and some ultrasound techniques make it possible to obtain cross sections of the human body.

A suitable approach for constructing a three dimensional surface of the human anatomy is made from the contour lines of human anatomy by the triangulation of a set of contours created from parallel slices corresponding to different levels. It can be briefly described as joining points of neighboring contour lines to generate triangles. The surface is represented by tessellating those contours, in which triangular elements are obtained to delimit a polyhedron approximating the surface of interest. The major problem in surface triangulation is the accuracy of the reconstructed surface and the reliability and complexity of the algorithm.

In view of the foregoing, a need exists for a contour triangulation system and method that can generate any complex surface with very good accuracy. The generation of the complex surface preferably will be fast and reliable and suitable for real time application.

SUMMARY OF THE INVENTION

An aspect of the present invention relates to a method of reconstructing a surface shape of an object from a plurality of contour lines. The method includes obtaining the plurality of contour lines by scanning the object to obtain scan data and segmenting the scan data to obtain the contour lines. The method also includes assigning points to each of the plurality of contour lines obtained from the segmented scan data, wherein each of the contour lines is closed and non-intersecting with respect to others of the contour lines. The method further includes performing a first triangulation scheme with respect to respective points on two adjacently-positioned contour lines, to determine a first surface shape for a portion of the object corresponding to the two adjacently-positioned contour lines. The method still further includes checking the first surface shape to determine if the first surface shape is in error. If the first surface shape is not in error, the method includes outputting the first surface shape for the portion of the object as determined by the first triangulation scheme, as a reconstructed surface shape for the portion of the object. If the first surface shape is in error, the method includes performing a second triangulation scheme with respect to the respective points on the two adjacently-positioned contour lines, to determine a second surface shape for the portion of the object corresponding to the two adjacently-positioned contour lines, and outputting the second surface shape for the portion of the object as determined by the second triangulation scheme, as a reconstructed surface shape for the portion of the object.

Yet another aspect of the present invention relates to a method of reconstructing a surface shape of an object from a plurality of contour lines. The method includes obtaining the plurality of contour lines by scanning the object to obtain scan data and segmenting the scan data to obtain the contour lines. The method also includes assigning points to each of the plurality of contour lines obtained from the segmented scan data, wherein each of the contour lines is closed and non-intersecting with respect to others of the contour lines. The method further includes performing a shortest distance triangulation scheme with respect to respective points on two adjacently-positioned contour lines that correspond to first and second contour lines, to determine a first surface shape for a portion of the object corresponding to the first and second contour lines. The shortest distance triangulation scheme includes:

a) for each point on the first contour line, determining a point on the second contour line that is closest to the point on the first contour line;

b) setting a first triangle leg as a line that connects the point on second contour line that is closest to the point on the first contour line;

c) comparing a first distance from the point on the second contour line to an adjacent point on the first contour line that is adjacent the point on the first contour line, to a second distance from an adjacent point on the second contour line to the point on the first contour line;

d) based on the comparing step, setting a second triangle leg as a line that connects the shorter one of the first and second distances, and setting a third triangle leg as a line that connects either the point and the adjacent point on the first contour line, or the point and the adjacent point on the second contour line; and e) repeating steps a) through d) by moving to a next point in either a clockwise direction or a counterclockwise direction on either the first contour line or the second contour line, until all points on the first and second contour lines have been connected to another point on the other of the first and second contour lines.

Yet another aspect of the present invention relates to a method of reconstructing a surface shape of an object from a plurality of contour lines. The method includes obtaining the plurality of contour lines by scanning the object to obtain scan data and segmenting the scan data to obtain the contour lines. The method also includes assigning points to each of the plurality of contour lines obtained from the segmented scan data, wherein each of the contour lines is closed and non-intersecting with respect to others of the contour lines. The method further includes performing a closest orientation triangulation scheme with respect to respective points on two adjacently-positioned contour lines that correspond to first and second contour lines, to determine a first surface shape for a portion of the object corresponding to the first and second contour lines. The closest orientation triangulation scheme includes:

a) for each point on the first contour line, determining an orientation of a centroid vector of the point on the first contour line to each contour point on the second contour line;

b) determining a closest orientation of the point on the first contour to a point on the second contour line;

c) repeating steps a) and b) until a closest orientation for all points on the first contour line have been determined;

d) setting a first triangle leg as a line that connects the point on second contour line that has the closest orientation to the point on the first contour line;

e) comparing a first orientation from the point on the second contour line to an adjacent point on the first contour line that is adjacent the point on the first contour line, to a second orientation from an adjacent point on the second contour line to the point on the first contour line;

f) based on the comparing step, setting a second triangle leg as a line that connects the shorter orientation of the first and second orientations, and setting a third triangle leg as a line that connects either the point and the adjacent point on the first contour line, or the point and the adjacent point on the second contour line; and g) repeating steps d) through f) by moving to a next point in either a clockwise direction or a counterclockwise direction on either the first contour line or the second contour line, until all points on the first and second contour lines have been connected to another point on the other of the first and second contour lines.

BRIEF DESCRIPTION OF THE DRAWINGS

The accompanying drawings, which are incorporated in and constitute a part of this specification, illustrate embodiments of the invention and together with the description serve to explain principles of the invention.

DETAILED DESCRIPTION OF PREFERRED EMBODIMENTS

Figure 1:
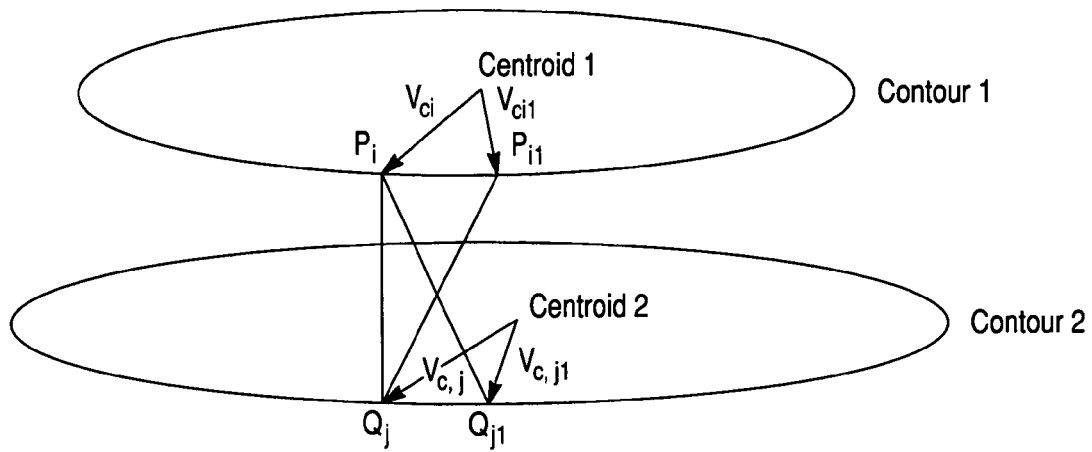
FIG. 1 is a perspective view of two contours for which a shortest distance triangulation scheme is performed in accordance with a first embodiment of the present invention.

Presently preferred embodiments of the invention are illustrated in the drawings. Although this specification refers primarily to obtaining a surface image of a bone, it should be understood that the subject matter described herein is applicable to other parts of the body, such as, for example, organs, intestines or muscles.

The first embodiment is directed to reconstructing a complex surface from a set of parallel contour lines obtained from scanning an object, such as a bone of a patient. By way of example and not by way of limitation, a CT scan of a patient's anatomy, such as the patient's knee, is made, in a raw data obtaining step, with the scanned data stored in a CT scan file. From that CT scan, the first embodiment reconstructs a 3D surface of the patient's knee, such as the outer surface of the femur and tibia bone. The format of the CT scan file can be obtained in any particular format that is readable by a general purpose computer, such as an Image Guidance System (IGS) format that is converted from a Digital Imaging and Communications in Medicine (DICOM) format, whereby such formats are well known to those skilled in the art.

The computer may be any known computing system but is preferably a programmable, processor-based system. For example, the computer may include a microprocessor, a hard drive, random access memory (RAM), read only memory (ROM), input/output (I/O) circuitry, and any other well-known computer component. The computer is preferably adapted for use with various types of storage devices (persistent and removable), such as, for example, a portable drive, magnetic storage (e.g., a floppy disk), solid state storage (e.g., a flash memory card), optical storage (e.g., a compact disc or CD), and/or network/Internet storage. The computer may comprise one or more computers, including, for example, a personal computer (e.g., an IBM-PC compatible computer) or a workstation (e.g., a SUN or Silicon Graphics workstation) operating under a Windows, UNIX, Linux, or other suitable operating system and preferably includes a graphical user interface (GUI).

Once the raw data has been obtained and has been loaded onto the computer, or onto a memory accessible by the computer, a surface construction of the raw data is made by way of the first embodiment, which may be embodied in program code executable by the computer. From the CT scan file data, a set of parallel slices (which can be in any orientation, transverse, sagittal, coronal, or oblique), also referred to herein as contour lines, are selected to encompass the entire femur or tibia bone. The number of slices can be determined by a trade-off of the work load of femur and tibia segmentation and the resolution of the reconstructed 3D surface. After the number and the position of slices are set, a manual segmentation is performed to separate the femur and tibia bone from the rest of the image. Any of a number of segmentation schemes can be employed to produce a set of contours in parallel planes, with one contour per plane. For example, "Live Wire" segmentation (edge measurement scheme) or "Snakes" segmentation (minimization scheme) may be performed, whereby these segmentation schemes are well known to those skilled in the art. The output obtained from scanning an object is a series of parallel images, whereby these images are input to a contouring process (any of ones known to those skilled in the art, such as the ones described above) that produces the contour lines. Each contour is represented by a set of contour points. The 3D coordinates (x, y, z) of each contour point are saved as the input to a triangulation processing unit according to the first embodiment. In the first embodiment, these contour points are ordered in the counter-clockwise (CCW) direction. Alternatively, they can be ordered in the clockwise (CW) direction. The triangulation processing unit according to the first embodiment can be embodied as program code executable by a computer. Contour lines can be concave in some areas, flat in other areas, and convex in yet other areas of a segmented scanned image, whereby each contour line is closed (e.g., the first point connects with the second point, the second point connects with the third point, . . . , and the last point connects with the first point on the same contour line) and non-intersecting with other contour lines.

In the first embodiment, a 'shortest distance' triangulation approach is provided by way of the triangulation processing unit of the computer, which generates a triangle strip between pairs of adjacent parallel contours. The 'shortest distance' triangulation approach according to the first embodiment is explained in detail hereinbelow.

Referring now to FIG. 1, a triangulation starts from point Pi on contour1 and point Qj on contour2. A next triangulation will pick up either Pi1 or Qj1 to generate the triangle patch PiPi1Qj or PiQjQj1. Pi1 is the point on contour1 that is closest to point Pi in the CCW direction, and point Qj1 is the point on contour 2 that is closest to point Qj in the CCW direction, whereby contour1 and contour2 are adjacently positioned contours. As shown in FIG. 1, Vci is the vector from Pi to the centroid of contour 1; Vcj is the vector from Qj to the centroid of contour2; Vci1 is the vector from Pi1 to the centroid of contour1, and Vcj1 is the vector from Qj1 to the centroid of contour2.

A first step in the shortest distance scheme according to the first embodiment is the selecting of the initial points. This initial point determination is done according to the following:

1) Set the minimum distance dmin to a large number (e.g., $2^{16}-1$ for a computer using 16-bit data words).

2) Start from one contour point on contour1, compute the distance to each contour point on contour2, and record the shortest distance as ds.

3) If ds is less than dmin, set dmin to the ds. Record the position of contour points on contour1 and contour2, by storing them in a memory accessible by the computer.

4) Move to another contour point in contour1, repeat steps 2) and 3).

5) Stop when all contour points on contour1 are checked.

Once the initial points have been determined for all points on the contours, the following shortest distance determination steps are performed in the first embodiment.

1) Select the two points Pi and Qj with the closest distance on contour1 and contour2, respectively.

2) Compare the distance from Pi to Qj1, and the distance from Pi1 to Qj. If Pi and Qj1 has shorter distance, then select Qj1 to generate triangle patch PiQjQj1. If Pi1 and Qj has shorter distance, then select Pi1 to generate triangle patch PiPi1Qj. See FIG. 2, which shows the two possible selections as dashed lines in that figure.

3) Perform steps 1) and 2) iteratively until all contour points have been selected for triangulation.

4) If one contour runs out of contour points, then stay at the end point at that contour and only select the neighboring point on the other contour to generate triangle patches in next iterations.

5) Stop when all contour points have been selected for triangulation.

FIGS. 2, 3, 4 and 5 show the detail process of triangulation by shortest distance metric. The following is pseudo code that may be used for the above shortest distance triangulation method.

```
k = num_contour_points1 + num_contour_points2;
point_i = start_point1;
point_j = start_point2;
do {
    distance1 = dist(point_i, point_j1);
    distance2 = dist(point_i1, point_j);
    if (distance1 < distance2) {
        point_j = point_j1;
        generate_triangle(i,j,j1);
    } else {
        point_i = point_i1;
        generate_triangle(i,i1,j);
    }
} while (k > 0);
```

The shortest distance solution according to the first embodiment assumes that triangulations generated by shortest distance have the closest approximation to the actual 3D surface. This is true in most cases. Thus, it generates visually a smooth surface that can approximate virtually any complex 3D surface, such as a tibia or femur of a patient's knee.

Figure 2:
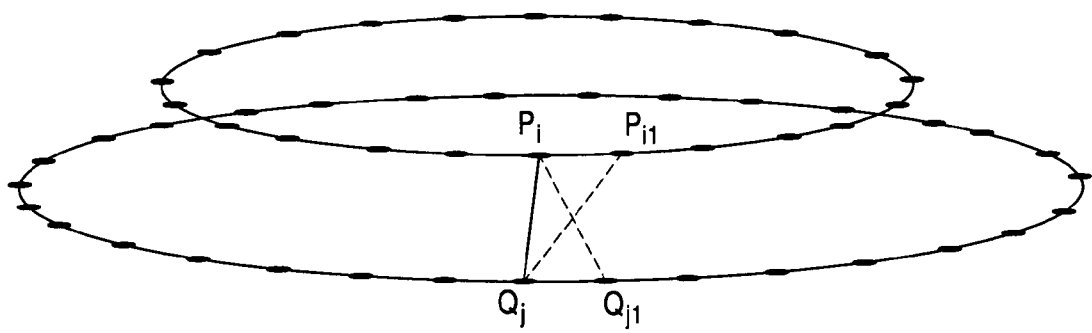
FIG. 2 is a perspective view of two contours for which initial points have been selected and for which two candidate distances are compared, in accordance with a first embodiment of the present invention.
Figure 3:
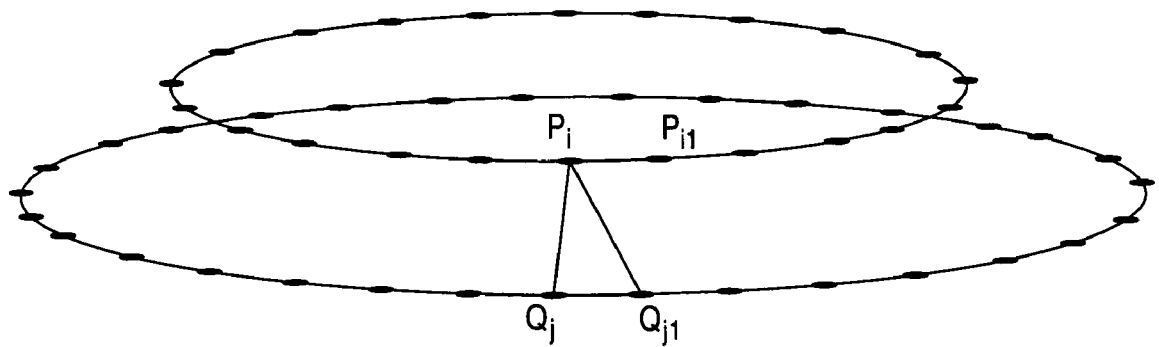
FIG. 3 is a perspective view of two contours for which a first triangle patch has been generated, in accordance with a first embodiment of the present invention.
Figure 4:
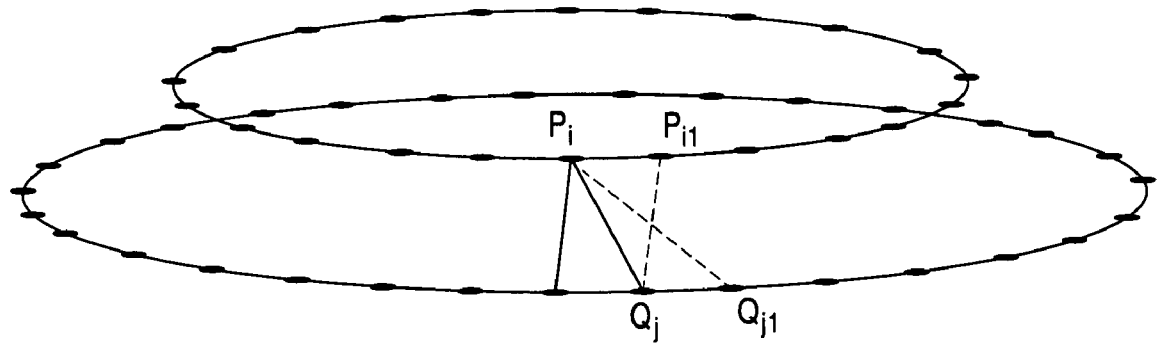
FIG. 4 is a perspective view of two contours for which a next iteration in the triangle patch generation scheme is started, in accordance with a first embodiment of the present invention.
Figure 5:
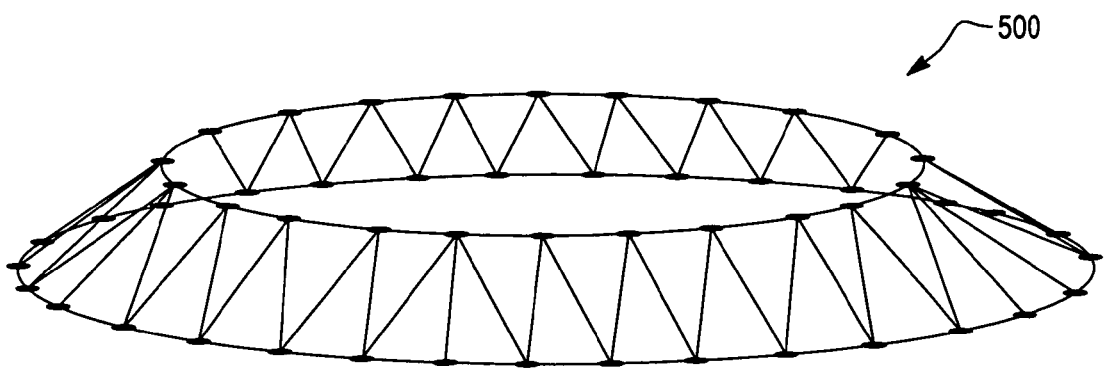
FIG. 5 is a perspective view of two contours for which a plurality of triangle patches have been generated, in accordance with a first embodiment of the present invention.

FIG. 2 shows the selection of initial points Pi and Qj with shortest distance, whereby two candidate distances PiQj1 and Pi1Qj are compared on the next step. FIG. 3 shows the selection of Qj1 as the shortest distance, which results in the generation of triangle patch PiQjQj1. FIG. 4 shows the updating of Qj to a new position, whereby the two candidate distances PiQj1 and Pi1Qj are compared on the next step. The new position of $Q_j$ corresponds to the position of $Q_{j1}$ in the previous step, as shown in FIG. 3. If the candidate distance PiQj1 is the shortest of the two distances in the second step, then the triangle patch $PiQ_jQj1$ is generated. If the candidate distance Pi1Qj is the shortest of the two distances in the second step, then the triangle patch $P_iPi1Qj$ is generated instead. FIG. 5 shows the final pattern 500 of the generation of triangle patches between all points of contour1 and contour2, in accordance with the shortest distance approach of the first embodiment.

The shortest distance approach is continued for each respective contour, in order to generate a 3D shape that reasonably approximates the true shape of the object that was scanned by a CT scanner, for example.

In a second embodiment, a 'closest orientation' triangulation approach is provided by way of the triangulation processing unit of the computer, which generates a triangle strip between pairs of adjacent parallel contours. The 'closest orientation' triangulation approach according to the second embodiment is explained in detail hereinbelow. The second embodiment provides a surface shape that reasonably approximates the true surface shape of a scanned object, similar to the purpose of the first embodiment. The triangulation processing unit of the second embodiment can be embodied as program code executable by a computer.

A first step in the closest orientation scheme according to the second embodiment is the selecting of the initial points. This initial point determination is done according to the following:

1) Set the closest orientation Orientmax to 0.

2) Start from one contour i point on contour1, compute the orientation of vector Vci to each contour point j on contour2. The orientation is the dot product of vectors Vci and Vcj. Store the closest orientation as Orientclosest.

3) If Orientclosest is larger than Orientmax, set Orientmax to the Orientclosest. Store the position of contour points on contour1 and contour2.

4) Move to another contour point in contour1, and repeat steps 2) and 3).

5) Stop when all contour points on contour1 are checked.

Once the initial points have been determined for all points on the contours, the following closest orientation determination steps are performed in the second embodiment.

1) This scheme starts from two points Pi and Qj with closest orientation related to the centroids of contour1 and contour2, respectively.

2) The next step compares the orientation of vector pair (Vci, Vcj1) and (Vcj, Vci1). If (Vci, Vcj1) has closer orientation, the next step will select Qj1 to generate triangle patch PiQjQj1. If (Vcj, Vci1) has closer orientation, the next step will select Pi1 to generate triangle patch PiPi1Qj.

3) These steps are run iteratively until all contour points are selected for triangulation.

4) If one contour runs out of contour points, the closest orientation scheme stays at the end point on that contour and select the neighboring point on the other contour to generate triangle patches in next iterations.

5) The closest orientation determination scheme stops when all contour points have been selected for triangulation.

Figure 6:
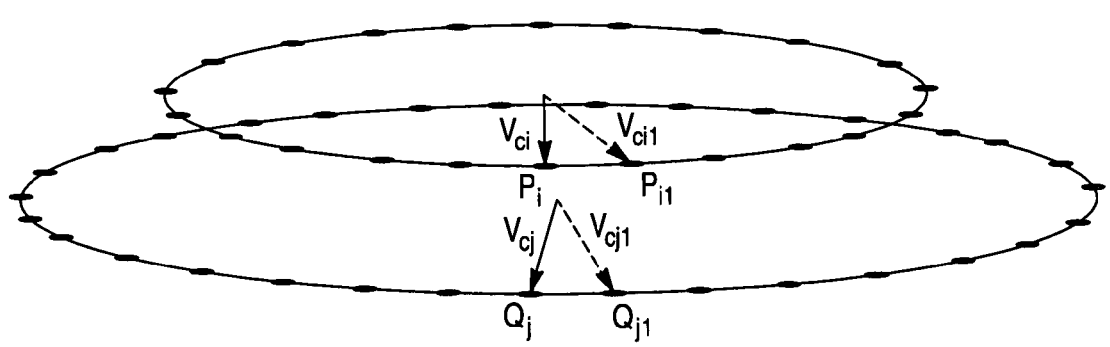
FIG. 6 is a perspective view of two contours for which a closest orientation triangulation scheme is performed in accordance with a second embodiment of the present invention.
Figure 7:
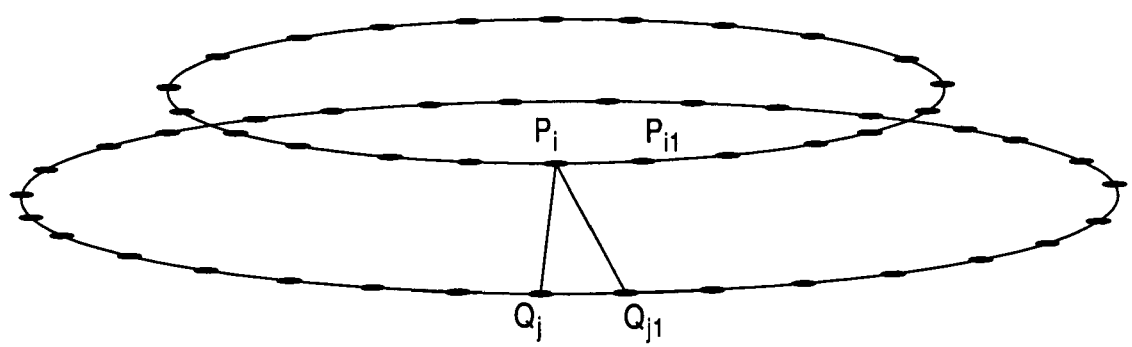
FIG. 7 is a perspective view of two contours for which initial points have been selected and for which two candidate closest orientation vector values are compared, in accordance with a second embodiment of the present invention.
Figure 8:
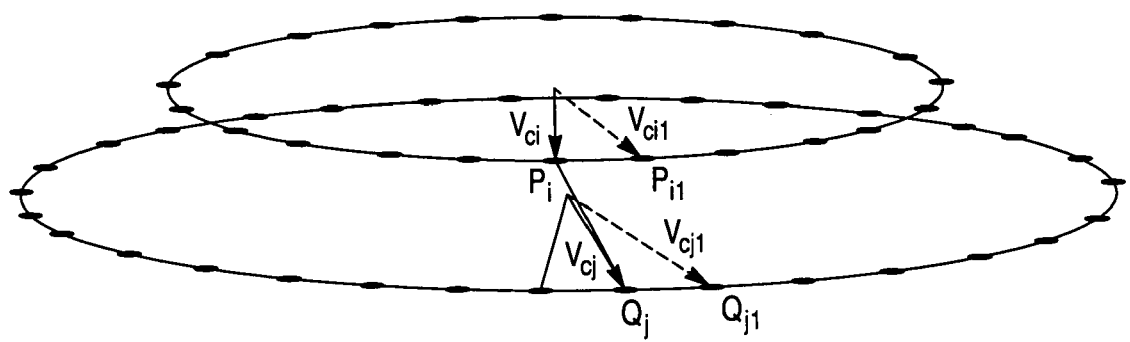
FIG. 8 is a perspective view of two contours for which a next iteration in the triangle patch generation scheme is started, in accordance with a second embodiment of the present invention.
Figure 9:
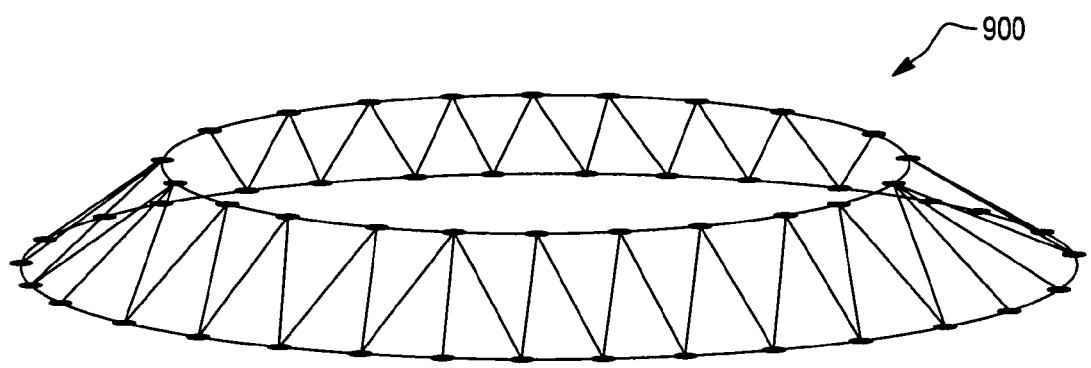
FIG. 9 is a perspective view of two contours for which a plurality of triangle patches have been generated, in accordance with a second embodiment of the present invention.

FIGS. 6 through 9 show the detail process of triangulation by closest orientation metric according to the second embodiment. FIG. 6 shows initial points Pi and Pj selected based on the initial point selection steps, and whereby orientation pairs (Vci, Vcj1) and (Vcj, Vci1) are compared at the step. FIG. 7 shows Qj1 selected by closet orientation, whereby the vector pair (Vci, Vcj1) had the closer orientation (larger value) in this example. Triangle patch PiQjQj1 is thereby created, as shown in FIG. 7. FIG. 8 shows the updating of Qj to its new position (the position of Qj1 in the previous step), whereby the orientation pairs (Vci, Vcj1) and (Vcj, Vci1) are compared in this next step. FIG. 9 shows the final pattern 900 of triangle patches generated from the two contour lines, by using the closest orientation scheme of the second embodiment.

The following is pseudo code that may be used for the closest orientation scheme of the second embodiment.

```
k = num_contour_points1 + num_contour_points2;
point_i = start_point1;
point_j = start_point2;
do {
    orient1 = orientation(vector_ci, vector_cj1);
    orient2 = orientation(vector_ci1, vector_cj);
    if (orient1 > orient2) {
        point_j = point_j1;
        generate_triangle(i,j,j1);
    } else {
        point_i = point_i1;
        generate_triangle(i,i1,j);
    }
} while (k > 0);
```

The closest orientation solution generates triangulations that are evenly distributed along the orientation related to the centroid of the contour. Thus, the closest orientation scheme is sufficient when contours have similar shape and orientation and are mutually centered.

A third embodiment of the invention will now be described in detail. The third embodiment obtains scanned data scanned (e.g., data obtained from a CT scan) from a patient, similar to the first and second embodiments. From that scanned data, a triangulation scheme is performed in order to obtain a surface structure from the scanned data. In the third embodiment, the shortest distance scheme as described with respect to the first embodiment is performed first. If the results of that scheme are acceptable, then the process is finished. If the results of that scheme are unacceptable, then the third embodiment performs a closest orientation scheme of the same scanned data, and outputs the results as the surface contour data.

Figure 10:
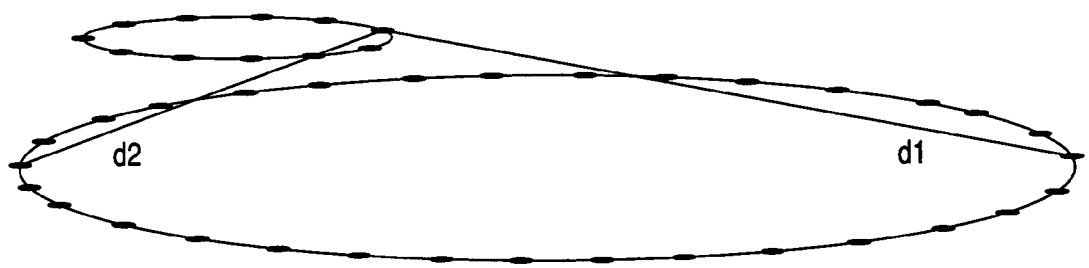
FIG. 10 is a perspective view of two contours for which an erroneous triangle patch has been generated by using the shortest distance triangulation scheme.
Figure 11:
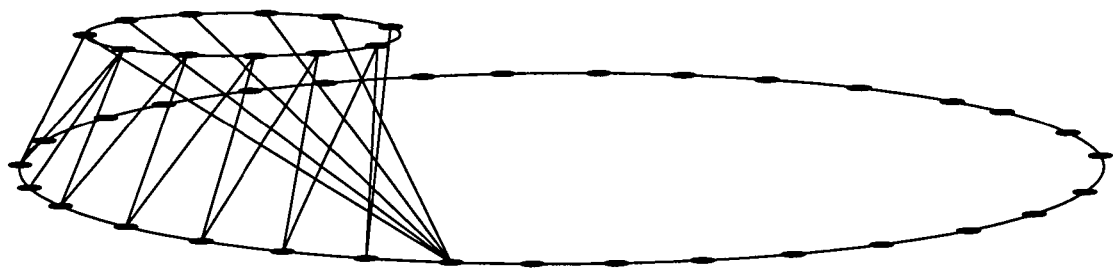
FIG. 11 is a perspective view of two contours for which an upper contour has run out of contour points.
Figure 12:
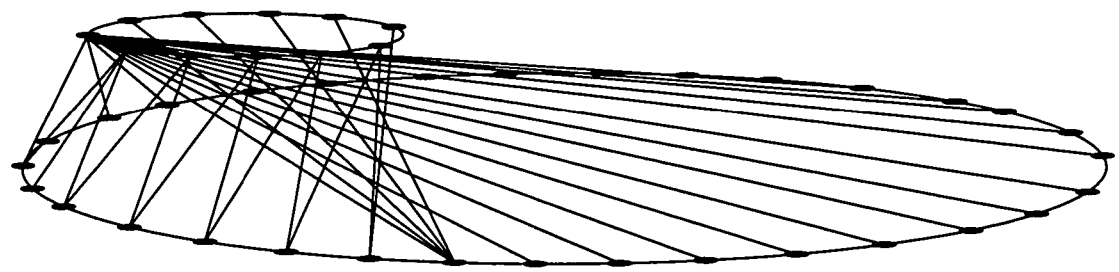
FIG. 12 is a perspective view of two contours for which a plurality of erroneous triangle patches have been generated by using the shortest distance triangulation scheme.

The reasoning behind the third embodiment is explained hereinbelow. The shortest distance scheme of the first embodiment works well for many complex 3D surface approximations. However, when two neighboring contours have a large difference in the number of contour points (e.g., one contour much shorter than a neighboring contour), and one contour is close to one side of the other contour, many points on the shorter contour connect to the contour points on the wrong side of the other contour by the shortest distance scheme. This is shown in FIG. 10, in which d2 is shorter than d1, whereby the correct connecting result d1 does not satisfy shortest distance metric. FIG. 11 shows the triangle patches when the upper contour runs out of contour points. The twisted triangle patches shown in FIG. 12 will generate a "button" like structure, which corresponds to a wrong or incorrect result. However, the closest orientation scheme according to the second embodiment will generate the correct result in this case. Thus, the proposed triangulation scheme according to the third embodiment combines two schemes. First, it generates a triangulation by a shortest distance solution, as explained above with respect to the first embodiment. If a wrong result is detected, it switches to the closest orientation solution, as explained above with respect to the second embodiment, and regenerates the triangulations. This will guarantee that the surface is a good approximation to the actual surface and the reconstruction is correct.

One feature of the third embodiment is the determination of when the first triangulation scheme has provided a 'wrong' result. This can be done by checking the respective centroid vectors of the connected points on the two adjacent contours. If the respective centroid vectors point in directions that are at least 90 degrees different from each other, then a wrong result is detected. For example, turning now to FIG. 10, the connected point on the lower contour has a centroid vector that points from the center of the lower contour to the connected point on the lower contour, while the connected point on the upper contour has a centroid vector that points from the center of the upper contour to the connected point on the upper contour, and whereby these two centroid vectors point in 180 degree different directions. Accordingly, the first, shortest distance triangulation scheme is stopped, and the second, closest orientation triangulation scheme is then applied to obtain a surface shape from the contour lines. In the third embodiment, after each connection of a point on a first contour to a point on the second contour is made in accordance with the shortest distance scheme, the respective centroid vectors are checked, and if they indicate an incorrect result, the third embodiment stops the shortest distance scheme, erases the results, and starts the closest orientation scheme.

A more detailed description of how an error may be detected by a checking step or checking unit in an output of a shortest distance triangulation scheme is provided below.

a) For each point on the first contour line, determine a point on the second contour line that is closest to the point on the first contour line.

b) Set a first triangle leg as a line that connects the point on the second contour line that is closest to the point on the first contour line.

c) Compare a first distance from the point on the second contour line to an adjacent point on the first contour line that is adjacent the point on the first contour line, to a second distance from an adjacent point on the second contour line to the point on the first contour line.

d) Based on the comparing performed in step c), set a second triangle leg as a line that connects the shorter one of the first and second distances, and set a third triangle leg as a line that connects either the point and the adjacent point on the first contour line, or the point and the adjacent point on the second contour line.

e) Check the orientation of the centroid vector for the point on the first contour line to the centroid vector for the point on the second contour line, if orientation is larger than a predetermined value (e.g., 90 degrees), the surface shape is in error, otherwise the surface shape is correct; wherein the orientation is determined by computing the dot product of the centroid vector of the point on the first contour line with the centroid vector of the point on the second contour line, wherein the negative dot product corresponds to the orientation larger than the predetermined value (e.g., 90 degrees).

f) Repeat steps a) through e) by moving to a next point in either a clockwise direction or a counterclockwise direction on either the first contour line or the second contour line, until all points on the first and second contour lines have been connected to another point on the other of the first and second contour lines.

Figure 13:
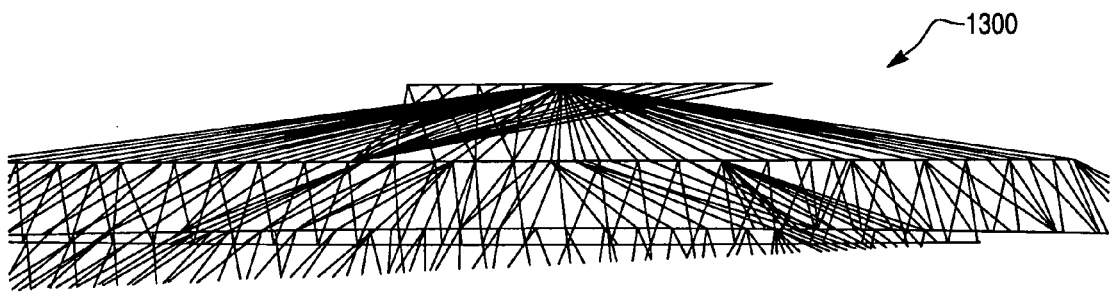
FIG. 13 shows an example of a surface shape created as a result of using erroneous triangular patches of the shortest distance triangulation scheme.
Figure 14:
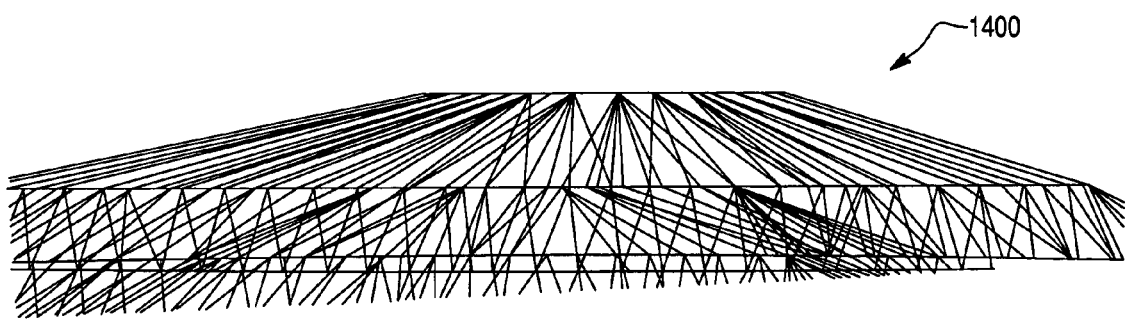
FIG. 14 shows an example of a surface shape created as a result of using correct triangular patches of the closest orientation triangulation scheme for the same contours that were used to generate the surface shape of FIG. 13.
Figure 15:
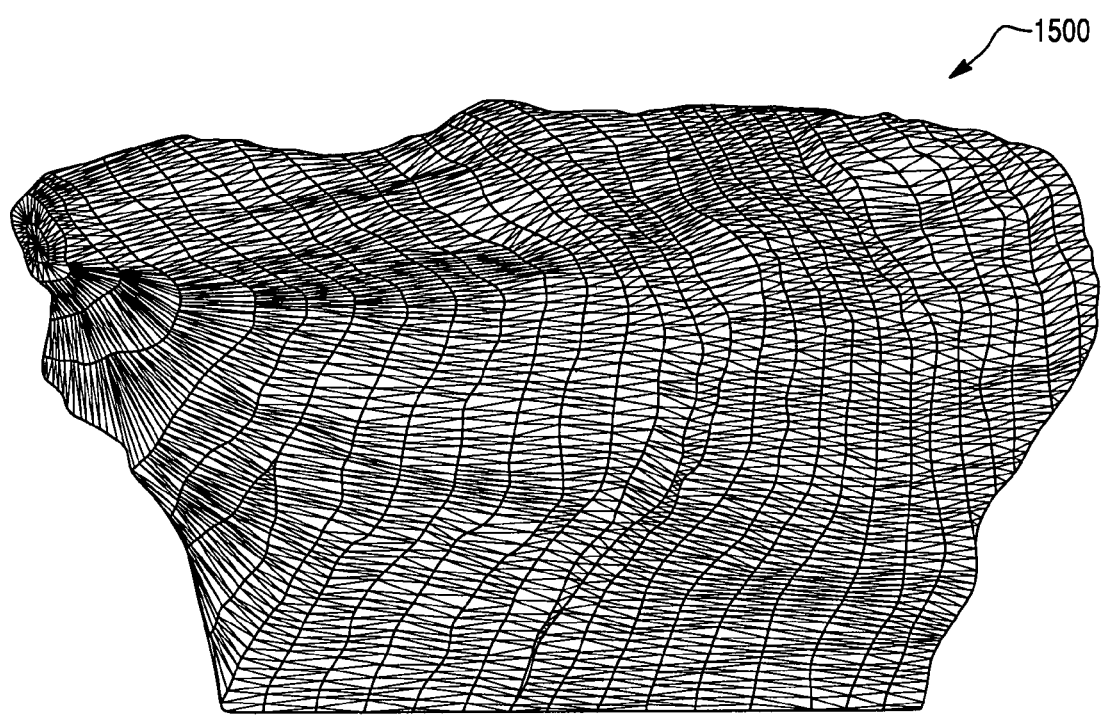
FIG. 15 shows a surface shape that is generated based on the triangulation patches generated as shown in FIG. 14.

The output of the triangulation scheme of the shortest distance approach and the closest orientation approach is a 'set of triangles' list. The coordination of three vertices are saved in memory, and are then used for surface rendering, for display on a display (e.g., computer monitor). FIG. 13 shows an example of a pattern of triangles 1300 created as a result of using erroneous triangular patches of the shortest distance triangulation scheme. This could have been due to at least one pair of adjacent contour lines having much different sizes from each other, for example. FIG. 14 shows an example of a pattern of triangles 1400 created as a result of using correct triangular patches of the closest orientation triangulation scheme for the same contours that were used to generate the pattern of triangles 1300 of FIG. 13. FIG. 15 shows a surface shape 1500 that is generated by an objection model creating unit and displayed based on the triangle patches generated as shown in FIG. 14. The generation of a surface shape 1500 from triangle patches and then from stacked triangulated contours is well known in the art, and will not be discussed in this application, for sake of brevity. However, according to at least one possible implementation of the present invention, an object model creating unit 255 as shown in FIG. 16 is different from conventional object model creating units in that it creates top and bottom portions of the surface shape (or model) by closing top and bottom contours of the stacked triangulated contours by using a respective centroid point as an apex of multiple triangles each formed from adjacent points on the respective top and bottom contours.

Figure 16:
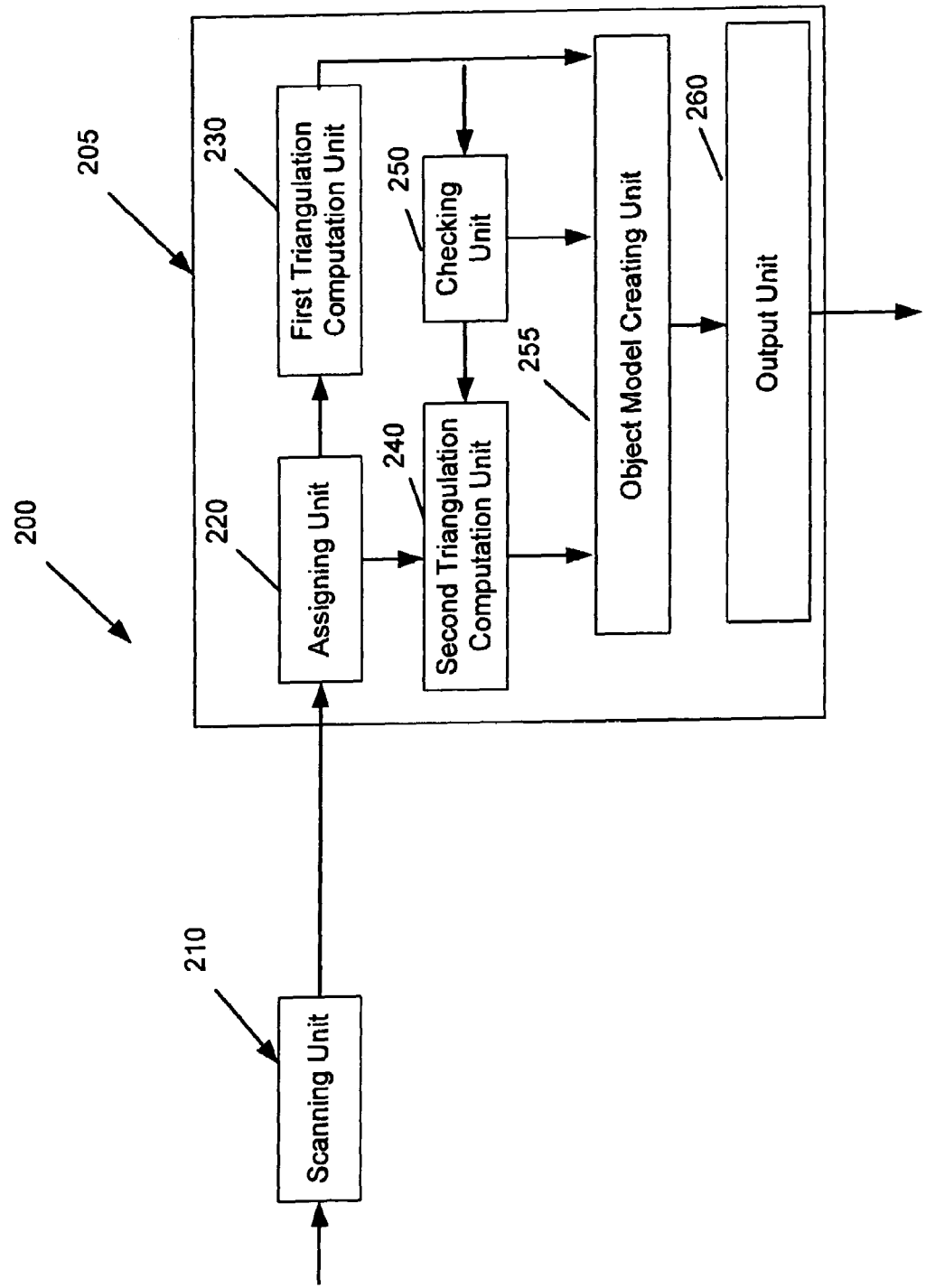
FIG. 16 shows a contour triangulation system in accordance with one or more embodiments of the invention.

FIG. 16 shows one possible system 200 for implementing the first, second or third embodiments of the invention. In FIG. 16, a scanning unit (e.g., a CT scanner) 210 scans an object, such as a part of a patient's body. The scan data is then provided to a computer 205. Note that segmentation of the scan data may be performed by the scanning unit 210 or by the computer 205. An assigning unit 220 assigns points to each of the contour lines obtained from the scan data. A first triangulation computation unit 230 performs a shortest distance triangulation scheme on the scan data, such as discussed above with respect to the first embodiment. A checking unit 250 checks for errors in the triangles generated by the first triangulation computation unit 230, as explained previously. A second triangulation computation unit 240 performs a closest orientation triangulation scheme on the scan data, such as discussed above with respect to the second embodiment. Based on whether or not the checking unit 250 has determined that an error exists in the triangle patches generated by the first triangulation computation unit 230, the second triangulation computation unit 240 will either do nothing, or will be instructed to perform its closest orientation processing on the scan data. The object model creating unit 255 generates a surface shape, or object model, from the triangle patches output by the first triangulation computation unit 230 or the triangle patches output by the second triangulation computation unit 240, in accordance with instructions provided by the checking unit 250. The output unit 260 outputs, to a display, the surface shape provided by the object model creating unit 255. The structure shown in FIG. 16 is for the third embodiment. For the first embodiment, the second triangulation computation unit 240 and the checking unit 250 are not provided, whereby the triangle patches generated by the first triangulation computation unit 230 are provided directly to the object model creating unit 255 and then to the output unit 260, for outputting onto a display. For the second embodiment, the first triangulation computation unit 230 and the checking unit 250 are not provided, whereby scan data is provided directly from the assigning unit 220 to the second triangulation computation unit 240.

Thus, embodiments of the present invention provide a contour triangulation apparatus and method in order to obtain a surface structure from scanned image data that includes plural contour lines. Other embodiments of the invention will be apparent to those skilled in the art from consideration of the specification and practice of the invention disclosed herein. It is intended that the specification and examples be considered as exemplary only.

What is claimed is:

1. A method of reconstructing a surface shape of an object from a plurality of contour lines, comprising:

obtaining a plurality of contour lines by scanning an object to obtain scan data and segmenting the scan data;

assigning points, by a computer, to each of the plurality of contour lines obtained from the segmented scan data of the object, wherein each of the contour lines is closed and non-intersecting with respect to others of the contour lines;

performing a first triangulation scheme with respect to respective points on two adjacently-positioned contour lines by the computer, to determine a first surface shape for a portion of the object corresponding to the two adjacently-positioned contour lines;

checking the first surface shape, by the computer, to determine if the first surface shape is in error;

if the first surface shape is not in error, outputting the first surface shape for the portion of the object as determined by the computer using the first triangulation scheme, as a reconstructed surface shape for the portion of the object; and if the first surface shape is in error, performing a second triangulation scheme with respect to the respective points on the two adjacently-positioned contour lines by the computer, to determine a second surface shape for the portion of the object corresponding to the two adjacently-positioned contour lines; and outputting the second surface shape for the portion of the object as determined by the computer using the second triangulation scheme, as a reconstructed surface shape for the portion of the object.

2. The method according to claim 1, wherein the first triangulation scheme is a shortest distance scheme, and wherein the second triangulation scheme is a closest orientation scheme.

3. The method according to claim 1, wherein the scanning step is accomplished by performing a CT scan of the object.

4. The method according to claim 1, wherein the object includes a bone structure of a patient.

5. The method according to claim 1, further comprising:
performing either or both of the first triangulation scheme or the second triangulation scheme with respect to respective points on each two adjacently-positioned contour lines of the plurality of contour lines, in order to obtain a full reconstructed surface shape of the object.

6. The method according to claim 1, wherein one of the first triangulation scheme and the second triangulation scheme includes a shortest distance triangulation scheme comprising:
a) for each point on the first contour line, determining a point on the second contour line that is closest to the point on the first contour line;
b) setting a first triangle leg as a line that connects the point on the second contour line that is closest to the point on the first contour line;
c) comparing a first distance from the point on the second contour line to an adjacent point on the first contour line that is adjacent the point on the first contour line, to a second distance from an adjacent point on the second contour line to the point on the first contour line;
d) based on the comparing step, setting a second triangle leg as a line that connects the shorter one of the first and second distances, and setting a third triangle leg as a line that connects either the point and the adjacent point on the first contour line, or the point and the adjacent point on the second contour line; and
e) repeating steps a) through d) by moving to a next point in either a clockwise direction or a counterclockwise direction on either the first contour line or the second contour line, until all points on the first and second contour lines have been connected to another point on the other of the first and second contour lines.

7. The method according to claim 6, wherein the other of the first triangulation scheme and the second triangulation scheme includes a closest orientation triangulation scheme comprising:
a) for each point on the first contour line, determining an orientation of a centroid vector of the point on the first contour line to each contour point on the second contour line;

b) determining a closest orientation of the centroid vector of the point on the first contour line to a centroid vector of a point on the second contour line;
c) repeating steps a) and b) until a closest orientation for all points on the first contour line have been determined;
d) setting a first triangle leg as a line that connects the point on the second contour line that has the closest orientation to the point on the first contour line;
e) comparing a first orientation from the point on the second contour line to an adjacent point on the first contour line that is adjacent the point on the first contour line, to a second orientation from an adjacent point on the second contour line to the point on the first contour line;
f) based on the comparing step, setting a second triangle leg as a line that connects the closest orientation of the first and second orientations, and setting a third triangle leg as a line that connects either the point and the adjacent point on the first contour line, or the point and the adjacent point on the second contour line; and
g) repeating steps d) through f) by moving to a next point in either a clockwise direction or a counterclockwise direction on either the first contour line or the second contour line, until all points on the first and second contour lines have been connected to another point on the other of the first and second contour lines.

8. The method according to claim 1, wherein one of the first triangulation scheme and the second triangulation scheme includes a closest orientation triangulation scheme comprising:
a) for each point on the first contour line, determining an orientation of a centroid vector of the point on the first contour line to each contour point on the second contour line;
b) determining a closest orientation of the centroid vector of the point on the first contour line to a centroid vector of a point on the second contour line;
c) repeating steps a) and b) until a closest orientation for all points on the first contour line have been determined;
d) setting a first triangle leg as a line that connects the point on the second contour line that has the closest orientation to the point on the first contour line;
e) comparing a first orientation from the point on the second contour line to an adjacent point on the first contour line that is adjacent the point on the first contour line, to a second orientation from an adjacent point on the second contour line to the point on the first contour line;
f) based on the comparing step, setting a second triangle leg as a line that connects the closest orientation of the first and second orientations, and setting a third triangle leg as a line that connects either the point and the adjacent point on the first contour line, or the point and the adjacent point on the second contour line; and
g) repeating steps d) through f) by moving to a next point in either a clockwise direction or a counterclockwise direction on either the first contour line or the second contour line, until all points on the first and second contour lines have been connected to another point on the other of the first and second contour lines.

9. The method according to claim 1, further comprising: creating a model of the object from multiple pairs of triangulated contours, wherein the multiple pairs of triangulated contours are stacked on top of each other.

10. The method according to claim 9, further comprising: closing top and bottom contours of the stacked triangulated contours by using a respective centroid point as an apex of multiple triangles each formed from adjacent points on the respective top and bottom contours.

11. The method according to claim 1, wherein the checking step comprises:
 a) for each point on the first contour line, determining a point on the second contour line that is closest to the point on the first contour line;
 b) setting a first triangle leg as a line that connects the point on the second contour line that is closest to the point on the first contour line;
 c) comparing a first distance from the point on the second contour line to an adjacent point on the first contour line that is adjacent the point on the first contour line, to a second distance from an adjacent point on the second contour line to the point on the first contour line;
 d) based on the comparing step, setting a second triangle leg as a line that connects the shorter one of the first and second distances, and setting a third triangle leg as a line that connects either the point and the adjacent point on the first contour line, or the point and the adjacent point on the second contour line;
 e) checking the orientation of the centroid vector for the point on the first contour line to the centroid vector for the point on the second contour line, if orientation is larger than 90 degrees, the surface shape is in error, otherwise the surface shape is correct; wherein the orientation is determined by computing a dot product of the centroid vector of the point on the first contour line with the centroid vector of the point on the second contour line, wherein the negative dot product corresponds to the orientation larger than 90 degrees;
 f) repeating steps a) through e) by moving to a next point in either a clockwise direction or a counterclockwise direction on either the first contour line or the second contour line, until all points on the first and second contour lines have been connected to another point on the other of the first and second contour lines.

12. A method of reconstructing a surface shape of an object from a plurality of contour lines, comprising:
 obtaining a plurality of contour lines by scanning an object to obtain scan data and segmenting the scan data;
 assigning points, by a computer, to each of the plurality of contour lines obtained from the segmented scan data of the object, wherein each of the contour lines is closed and non-intersecting with respect to others of the contour lines;
 performing a shortest distance triangulation scheme with respect to respective points on two adjacently-positioned contour lines that correspond to first and second contour lines by the computer, to determine a first surface shape for a portion of the object corresponding to the first and second contour lines,
 wherein the shortest distance triangulation scheme comprises:
 a) for each point on the first contour line, determining a point on the second contour line that is closest to the point on the first contour line;
 b) setting a first triangle leg as a line that connects the point on the second contour line that is closest to the point on the first contour line;
 c) comparing a first distance from the point on the second contour line to an adjacent point on the first contour line that is adjacent the point on the first contour line, to a second distance from an adjacent point on the second contour line to the point on the first contour line;
 d) based on the comparing step, setting a second triangle leg as a line that connects the shorter one of the first and second distances, and setting a third triangle leg as a line that connects either the point and the adjacent point on the first contour line, or the point and the adjacent point on the second contour line; and
 e) repeating steps a) through d) by moving to a next point in either a clockwise direction or a counterclockwise direction on either the first contour line or the second contour line, until all points on the first and second contour lines have been connected to another point on the other of the first and second contour lines.

13. The method according to claim 12, wherein the scanning step is accomplished by performing a CT scan of the object.

14. The method according to claim 12, wherein the object includes a bone structure of a patient.

15. The method according to claim 12, further comprising:
 creating a model of the object from multiple pairs of triangulated contours, wherein the multiple pairs of triangulated contours are stacked on top of each other.

16. The method according to claim 15, further comprising:
 closing top and bottom contours of the stacked triangulated contours by using a respective centroid point as an apex of multiple triangles each formed from adjacent points on the respective top and bottom contours.

17. A method of reconstructing a surface shape of an object from a plurality of contour lines, comprising:
 obtaining a plurality of contour lines by scanning an object to obtain scan data and segmenting the scan data;
 assigning points, by a computer, to each of the plurality of contour lines obtained from the segmented scan data of the object, wherein each of the contour lines is closed and non-intersecting with respect to others of the contour lines;
 performing a closest orientation triangulation scheme with respect to respective points on two adjacently-positioned contour lines that correspond to first and second contour lines by the computer, to determine a first surface shape for a portion of the object corresponding to the first and second contour lines,
 wherein the closest orientation triangulation scheme comprises:
 a) for each point on the first contour line, determining an orientation of a centroid vector of the point on the first contour line to each contour point on the second contour line;
 b) determining a closest orientation of the centroid vector of the point on the first contour line to a centroid vector of a point on the second contour line;
 c) repeating steps a) and b) until a closest orientation for all points on the first contour line have been determined;
 d) setting a first triangle leg as a line that connects the point on the second contour line that has the closest orientation to the point on the first contour line;
 e) comparing a first orientation from the point on the second contour line to an adjacent point on the first contour line that is adjacent the point on the first contour line, to a second orientation from an adjacent point on the second contour line to the point on the first contour line;
 f) based on the comparing step, setting a second triangle leg as a line that connects the closest orientation of the first and second orientations, and setting a third triangle leg as a line that connects either the point and the adjacent point on the first contour line, or the point and the adjacent point on the second contour line; and
 g) repeating steps d) through f) by moving to a next point in either a clockwise direction or a counterclockwise direction on either the first contour line or the second contour line, until all points on the first and second contour lines have been connected to another point on the other of the first and second contour lines.

18. The method according to claim 17, wherein the scanning step is accomplished by performing a CT scan of the object.

19. The method according to claim 17, wherein the object includes a bone structure of a patient.

20. The method according to claim 17, wherein the closest orientation of the centroid vector of the point on the first contour line to the centroid vector of a point on the second contour line is determined by computing a dot product of the centroid vector of the point on the first contour line with a centroid vector of each point on the second contour line, wherein the point on the second contour line having the smallest dot product corresponds to the closest orientation.

21. The method according to claim 17, further comprising: creating a model of the object from multiple pairs of triangulated contours, wherein the multiple pairs of triangulated contours are stacked on top of each other.

22. The method according to claim 21, further comprising: closing top and bottom contours of the stacked triangulated contours by using a respective centroid point as an apex of multiple triangles each formed from adjacent points on the respective top and bottom contours.

23. A computer readable memory having stored thereon program code executable on a computer that when executed by the computer cause the computer to perform a method comprising:
  assigning points to each of a plurality of contour lines obtained from segmented scan data of an object, wherein each of the contour lines is closed and non-intersecting with respect to others of the contour lines;
  performing a first triangulation scheme with respect to respective points on two adjacently-positioned contour lines, to determine a first surface shape for a portion of the object corresponding to the two adjacently-positioned contour lines;
  checking the first surface shape to determine if the first surface shape is in error;
  if the first surface shape is not in error, outputting the first surface shape for the portion of the object as determined by the first triangulation scheme, as a reconstructed surface shape for the portion of the object; and
  if the first surface shape is in error,
  performing a second triangulation scheme with respect to the respective points on the two adjacently-positioned contour lines, to determine a second surface shape for the portion of the object corresponding to the two adjacently-positioned contour lines; and
  outputting the second surface shape for the portion of the object as determined by the second triangulation scheme, as a reconstructed surface shape for the portion of the object.

24. The computer readable memory according to claim 23, wherein the first triangulation scheme is a shortest distance scheme, and wherein the second triangulation scheme is a closest orientation scheme.

25. The computer readable memory according to claim 23, wherein the plurality of contour lines is obtained by performing a CT scan of the object and segmenting the scan data.

26. The computer readable memory according to claim 23, wherein the object includes a bone structure of a patient.

27. The computer readable memory according to claim 23, wherein the method further comprises:
  performing either or both of the first triangulation scheme or the second triangulation scheme with respect to respective points on each two adjacently-positioned contour lines of the plurality of contour lines, in order to obtain a full reconstructed surface shape of the object.

28. The computer readable memory according to claim 23, wherein one of the first triangulation scheme and the second triangulation scheme includes a shortest distance triangulation scheme comprising:
  a) for each point on the first contour line, determining a point on the second contour line that is closest to the point on the first contour line;
  b) setting a first triangle leg as a line that connects the point on the second contour line that is closest to the point on the first contour line;
  c) comparing a first distance from the point on the second contour line to an adjacent point on the first contour line that is adjacent the point on the first contour line, to a second distance from an adjacent point on the second contour line to the point on the first contour line;
  d) based on the comparing step, setting a second triangle leg as a line that connects the shorter one of the first and second distances, and setting a third triangle leg as a line that connects either the point and the adjacent point on the first contour line, or the point and the adjacent point on the second contour line; and
  e) repeating steps a) through d) by moving to a next point in either a clockwise direction or a counterclockwise direction on either the first contour line or the second contour line, until all points on the first and second contour lines have been connected to another point on the other of the first and second contour lines.

29. The computer readable memory according to claim 28, wherein the other of the first triangulation scheme and the second triangulation scheme includes a closest orientation triangulation scheme comprising:
  a) for each point on the first contour line, determining an orientation of a centroid vector of the point on the first contour line to each contour point on the second contour line;
  b) determining a closest orientation of the centroid vector of the point on the first contour line to a centroid vector of a point on the second contour line;
  c) repeating steps a) and b) until a closest orientation for all points on the first contour line have been determined;
  d) setting a first triangle leg as a line that connects the point on the second contour line that has the closest orientation to the point on the first contour line;
  e) comparing a first orientation from the point on the second contour line to an adjacent point on the first contour line that is adjacent the point on the first contour line, to a second orientation from an adjacent point on the second contour line to the point on the first contour line;
  f) based on the comparing step, setting a second triangle leg as a line that connects the closest orientation of the first and second orientations, and setting a third triangle leg as a line that connects either the point and the adjacent point on the first contour line, or the point and the adjacent point on the second contour line; and
  g) repeating steps d) through f) by moving to a next point in either a clockwise direction or a counterclockwise direction on either the first contour line or the second contour line, until all points on the first and second contour lines have been connected to another point on the other of the first and second contour lines.

30. The computer readable memory according to claim 23, wherein one of the first triangulation scheme and the second triangulation scheme includes a closest orientation triangulation scheme comprising:

a) for each point on the first contour line, determining an orientation of a centroid vector of the point on the first contour line to each contour point on the second contour line;

b) determining a closest orientation of the centroid vector of the point on the first contour line to a centroid vector of a point on the second contour line;

c) repeating steps a) and b) until a closest orientation for all points on the first contour line have been determined;

d) setting a first triangle leg as a line that connects the point on the second contour line that has the closest orientation to the point on the first contour line;

e) comparing a first orientation from the point on the second contour line to an adjacent point on the first contour line that is adjacent the point on the first contour line, to a second orientation from an adjacent point on the second contour line to the point on the first contour line;

f) based on the comparing step, setting a second triangle leg as a line that connects the closest orientation of the first and second orientations, and setting a third triangle leg as a line that connects either the point and the adjacent point on the first contour line, or the point and the adjacent point on the second contour line; and g) repeating steps d) through f) by moving to a next point in either a clockwise direction or a counterclockwise direction on either the first contour line or the second contour line, until all points on the first and second contour lines have been connected to another point on the other of the first and second contour lines.

31. The computer readable memory according to claim 23, wherein the method further comprises:
creating a model of the object from multiple pairs of triangulated contours, wherein the multiple pairs of triangulated contours are stacked on top of each other.

32. The computer readable memory according to claim 31, wherein the method further comprises:
closing top and bottom contours of the stacked triangulated contours by using a respective centroid point as an apex of multiple triangles each formed from adjacent points on the respective top and bottom contours.

33. The computer readable memory according to claim 23, wherein the checking step comprises:
a) for each point on the first contour line, determining a point on the second contour line that is closest to the point on the first contour line;

b) setting a first triangle leg as a line that connects the point on the second contour line that is closest to the point on the first contour line;

c) comparing a first distance from the point on the second contour line to an adjacent point on the first contour line that is adjacent the point on the first contour line, to a second distance from an adjacent point on the second contour line to the point on the first contour line;

d) based on the comparing step, setting a second triangle leg as a line that connects the shorter one of the first and second distances, and setting a third triangle leg as a line that connects either the point and the adjacent point on the first contour line, or the point and the adjacent point on the second contour line;

e) checking the orientation of the centroid vector for the point on the first contour line to the centroid vector for the point on the second contour line, if orientation is larger than 90 degrees, the surface shape is in error, otherwise the surface shape is correct; wherein the orientation is determined by computing a dot product of the centroid vector of the point on the first contour line with the centroid vector of the point on the second contour line, wherein the negative dot product corresponds to the orientation larger than 90 degrees;

f) repeating steps a) through e) by moving to a next point in either a clockwise direction or a counterclockwise direction on either the first contour line or the second contour line, until all points on the first and second contour lines have been connected to another point on the other of the first and second contour lines.

34. A computer readable having stored thereon program code executable on a computer that when executed by the computer cause the computer to perform a method comprising:
assigning points to each of a plurality of contour lines obtained from segmented scan data of an object, wherein each of the contour lines is closed and non-intersecting with respect to others of the contour lines;

performing a shortest distance triangulation scheme with respect to respective points on two adjacently-positioned contour lines that correspond to first and second contour lines, to determine a first surface shape for a portion of the object corresponding to the first and second contour lines, wherein the shortest distance triangulation scheme comprises:
a) for each point on the first contour line, determining a point on the second contour line that is closest to the point on the first contour line;

b) setting a first triangle leg as a line that connects the point on the second contour line that is closest to the point on the first contour line;

c) comparing a first distance from the point on the second contour line to an adjacent point on the first contour line that is adjacent the point on the first contour line, to a second distance from an adjacent point on the second contour line to the point on the first contour line;

d) based on the comparing step, setting a second triangle leg as a line that connects the shorter one of the first and second distances, and setting a third triangle leg as a line that connects either the point and the adjacent point on the first contour line, or the point and the adjacent point on the second contour line; and e) repeating steps a) through d) by moving to a next point in either a clockwise direction or a counterclockwise direction on either the first contour line or the second contour line, until all points on the first and second contour lines have been connected to another point on the other of the first and second contour lines.

35. The computer readable memory according to claim 34, wherein the plurality of contour lines is obtained by performing a CT scan of the object and segmenting the scan data.

36. The computer readable memory according to claim 34, wherein the object includes a bone structure of a patient.

37. The computer readable memory according to claim 34, wherein the method further comprises:
creating a model of the object from multiple pairs of triangulated contours, wherein the multiple pairs of triangulated contours are stacked on top of each other.

38. The computer readable memory according to claim 37, wherein the method further comprises:
closing top and bottom contours of the stacked triangulated contours by using a respective centroid point as an apex of multiple triangles each formed from adjacent points on the respective top and bottom contours.

39. A computer readable memory having stored thereon program code executable on a computer that when executed by the computer cause the computer to perform a method comprising:

assigning points to each of a plurality of contour lines obtained from segmented scan data of an object, wherein each of the contour lines is closed and non-intersecting with respect to others of the contour lines;

performing a closest orientation triangulation scheme with respect to respective points on two adjacently-positioned contour lines that correspond to first and second contour lines, to determine a first surface shape for a portion of the object corresponding to the first and second contour lines, wherein the closest orientation triangulation scheme comprises:

a) for each point on the first contour line, determining an orientation of a centroid vector of the point on the first contour line to each contour point on the second contour line;

b) determining a closest orientation of the centroid vector of the point on the first contour line to a centroid vector of a point on the second contour line;

c) repeating steps a) and b) until a closest orientation for all points on the first contour line have been determined;

d) setting a first triangle leg as a line that connects the point on the second contour line that has the closest orientation to the point on the first contour line;

e) comparing a first orientation from the point on the second contour line to an adjacent point on the first contour line that is adjacent the point on the first contour line, to a second orientation from an adjacent point on the second contour line to the point on the first contour line;

f) based on the comparing step, setting a second triangle leg as a line that connects the closest orientation of the first and second orientations, and setting a third triangle leg as a line that connects either the point and the adjacent point on the first contour line, or the point and the adjacent point on the second contour line; and g) repeating steps d) through t) by moving to a next point in either a clockwise direction or a counterclockwise direction on either the first contour line or the second contour line, until all points on the first and second contour lines have been connected to another point on the other of the first and second contour lines.

40. The computer readable memory according to claim 39, wherein the plurality of contour lines is obtained by performing a CT scan of the object and segmenting the scan data.

41. The computer readable memory according to claim 39, wherein the object includes a bone structure of a patient.

42. The computer readable memory according to claim 39, wherein the closest orientation of the centroid vector of the point on the first contour line to the centroid vector of a point on the second contour line is determined by computing a dot product of the centroid vector of the point on the first contour line with a centroid vector of each point on the second contour line, wherein the point on the second contour line having the smallest dot product corresponds to the closest orientation.

43. The computer readable memory according to claim 39, wherein the method further comprises:

creating a model of the object from multiple pairs of triangulated contours, wherein the multiple pairs of triangulated contours are stacked on top of each other.

44. The computer readable memory according to claim 43, wherein the method further comprises:

closing top and bottom contours of the stacked triangulated contours by using a respective centroid point as an apex of multiple triangles each formed from adjacent points on the respective top and bottom contours.

45. An apparatus for reconstructing a surface shape of an object from a plurality of contour lines, comprising:

a scanner unit configured to obtain the plurality of contour lines by scanning the object to obtain scan data and to segment the scan data;

an assigning unit configured to assign points to each of the plurality of contour lines obtained from the segmented scan data, wherein each of the contour lines is closed and non-intersecting with respect to others of the contour lines;

a first triangulation computation unit configured to perform a first triangulation scheme with respect to respective points on two adjacently-positioned contour lines, to determine a first surface shape for a portion of the object corresponding to the two adjacently-positioned contour lines;

a checking unit configured to check the first surface shape to determine if the first surface shape is in error;

a second triangulation computation unit configured to perform a second triangulation scheme with respect to the respective points on the two adjacently-positioned contour lines, to determine a second surface shape for the portion of the object corresponding to the two adjacently-positioned contour lines; and an output and display unit configured to output and display either the first surface shape as output by the first triangulation computation unit or the second surface shape as output by the second triangulation computation unit, as a reconstructed surface shape for the portion of the object.

46. The apparatus according to claim 45, wherein the first triangulation computation unit performs a shortest distance triangulation, and wherein the second triangulation computation unit performs a closest orientation triangulation.

47. The apparatus according to claim 45, wherein the scanner unit includes a CT scanner.

48. The apparatus according to claim 45, wherein the object includes a bone structure of a patient.

49. The apparatus according to claim 45, further comprising:

an object model creating unit configured to create a model of the object from multiple pairs of triangulated contours, wherein the multiple pairs of triangulated contours are stacked on top of each other.

50. The apparatus according to claim 49, wherein the object model creating unit creates top and bottom portions of the model by closing top and bottom contours of the stacked triangulated contours by using a respective centroid point as an apex of multiple triangles each formed from adjacent points on the respective top and bottom contours.

51. The apparatus according to claim 45, wherein the checking unit comprises: means for determining, for each point on the first contour line, a point on the second contour line that is closest to the point on the first contour line;

means for setting a first triangle leg as a line that connects the point on the second contour line that is closest to the point on the first contour line;

means for comparing a first distance from the point on the second contour line to an adjacent point on the first contour line that is adjacent the point on the first contour line, to a second distance from an adjacent point on the second contour line to the point on the first contour line;

means for setting, based on the comparing step, a second triangle leg as a line that connects the shorter one of the first and second distances, and setting a third triangle leg as a line that connects either the point and the adjacent point on the first contour line, or the point and the adjacent point on the second contour line;

means for checking the orientation of the centroid vector for the point on the first contour line to the centroid vector for the point on the second contour line, if orientation is larger than 90 degrees, the surface shape is in error, otherwise the surface shape is correct;

wherein the orientation is determined by computing a dot product of the centroid vector of the point on the first contour line with the centroid vector of the point on the second contour line, wherein the negative dot product corresponds to the orientation larger than 90 degrees, wherein the checking unit performs checking by moving to a next point in either a clockwise direction or a counterclockwise direction on either the first contour line or the second contour line, until all points on the first and second contour lines have been connected to another point on the other of the first and second contour lines.

* * * * *

UNITED STATES PATENT AND TRADEMARK OFFICE
CERTIFICATE OF CORRECTION

| | | |
|---|---|---|
| PATENT NO. | : 7,623,702 B2 | Page 1 of 1 |
| APPLICATION NO. | : 11/411951 | |
| DATED | : November 24, 2009 | |
| INVENTOR(S) | : Arata et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 881 days.

Signed and Sealed this

Twenty-sixth Day of October, 2010

David J. Kappos
*Director of the United States Patent and Trademark Office*